Patented Aug. 11, 1953

2,648,700

UNITED STATES PATENT OFFICE 2,648,700

2-METHYL - 2,7 - DIHYDROXY-OCTAHYDRO-PHENANTHRENE-1-PROPIONIC ACID AND DERIVATIVES THEREOF

Robert P. Jacobsen, Shrewsbury, and Gregory Pincus, Worcester, Mass., assignors to G. D. Searle & Co., Chicago, Ill., a corporation of Illinois No Drawing. Original application November 2, 1946, Serial No. 707,536. Divided and this application March 1, 1949, Serial No. 79,108

11 Claims. (Cl. 260—473)

This invention relates to a new dihydroxy acid whose formula is $C_{18}H_{24}O_4$ and which contains the same 2-methyl-7-hydroxyoctahydrophenanthrene nucleus that occurs in estrone, and to the salts and to the ether and ester derivatives of this acid.

This application is a division of our copending application Serial No. 707,536, filed November 2, 1946, now Patent 2,480,246.

This new dihydroxy acid and the hydroxy lactone derived therefrom are conveniently prepared by the oxidation of estrone as described below, while the salts, ester, and ether derivatives are prepared from the acid or lactone by conventional operations. These new compounds are useful and valuable in therapeutics in that they possess the property of inhibiting certain secretions of the anterior portion of the pituitary gland, while at the same time being free from any appreciable estrogenic activity.

The pituitary gland, as the so-called master gland of the body, elaborates and secretes certain hormones which control and stimulate the secretions of certain other glands, including the ovaries. The ovaries in turn are the source of secretion of the various estrogenic hormones. These estrogenic hormones, in addition to controlling phases of the menstrual cycle and organs of the female reproductive system, also act to inhibit certain phases of the activity of the pituitary gland, forming in this way a self-regulating system of physiological balance. At the time of the menopause, secretion of estrogens by the ovaries ceases. As a result, secretions of gonadotrophin (the hormone or hormones which stimulate the activity of the gonads to secrete estrogenic hormones) and other hormones by the pituitary often reach excessive levels since they are no longer restrained by the presence of estrogenic hormones. This tends to cause many of the unpleasant and undesirable symptoms frequently associated with the menopause. The administration of estrogenic hormone substances is known to control such symptoms, at least in part through their pituitary inhibition, but it produces undesirable estrogenic effects at the same time. Thus it will be seen that a substance which will effectively inhibit certain pituitary activity and at the same time not produce estrogenic activity is a useful, valuable, and desirable addition to the field of therapeutics. It is the object of this invention to provide such a substance.

In 1942, Westerfeld reported (Journal Biological Chemistry, vol. 143, page 177) the preparation of a crystalline oxidation product of estrone, which oxidation product was apparently a lactone in chemical structure, and which possessed estrogenic properties, though to a lesser degree than was possessed by the estrone from which it was derived. Subsequently (Endocrinology, vol. 35, page 146; and Proceedings of the Society for Experimental Biology and Medicine, vol. 59, page 242), the estrogenic nature of this lactone was confirmed and it was shown to act as a more potent stimulant to pituitary activity than estrone itself. In attempting to prepare the so-called Westerfeld lactone to better advantage than previously described, Mather discovered that estrone could be oxidized by hydrogen peroxide in glacial acetic acid to yield what appeared at that time to be Westerfeld's lactone, which process is the subject of a now abandoned copending application of Alan Mather, Serial No. 610,203, filed August 10, 1945. Working with a modification of Mather's process, we have now found that the product thus obtained is not in fact the original Westerfeld lactone, but is a different compound, also a lactone, but possessing somewhat different chemical properties and with markedly different physiological properties, as hereinafter described.

The composition of this invention is conveniently prepared as follows:

One part by weight of estrone acetate of the formula

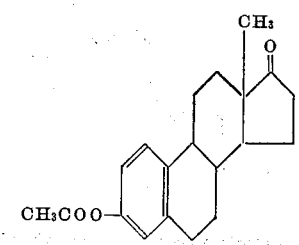

is dissolved in about 8 parts by weight of glacial acetic acid, and about 6 parts by weight of a commercial 30 per cent aqueous solution of hydrogen peroxide is added. The mixture is maintained at about 35° centigrade for from 55 to 60 hours, at the end of which time water is gradually added until crystallization of the product is complete. The reaction may be carried out at other temperatures in the range from 25° C. to 60° C., though it will be apparent to one skilled in the art that at higher temperatures the time of reaction must be appropriately reduced, and at lower temperatures the reaction period must be suitably extended. The crude crystals (melting point 144° C.–148° C.) as obtained above are best purified by hydrolysis in hot aqueous alkali such as sodium or potassium hydroxide solution. After cooling, this solution is saturated with carbon dioxide, normally causing it to become cloudy. It is clarified by filtration (preferably using an inert filter aid such as an infusorial earth), and from the material removed by this process, a small amount of crude, unchanged estrone may be recovered. The clear filtrate is made acid to Congo red, and the resulting suspension is warmed to complete formation of the lactone from the dihydroxy acid as first precipitated. The solid lactone is then collected, washed with water, and after thorough drying, is acetylated with acetic anhydride in pyridine solution. The pure acetoxy lactone of the formula

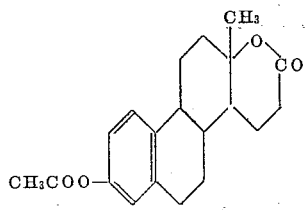

crystallizes from methanol in the form of heavy diamond-shaped crystals which melt at 149°–151.5° C., and have a rotation of $[\alpha]^D = +42°$ in chloroform. The melting point 143.5°–145° C. was reported by Westerfeld for his compound.

The pure dihydroxy acid of this invention is readily prepared from this acetoxy lactone by hydrolysis in hot sodium hydroxide solution, and careful acidification of the solution after cooling. This acid of the formula

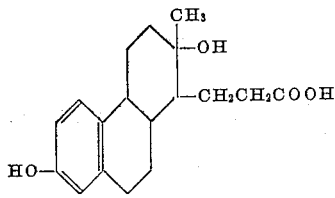

melts at 225° C. with decomposition, and is somewhat unstable, showing a marked tendency to lose one molecule of water through inner esterification of one of its hydroxyl groups by the carboxyl group to yield a stable monohydroxy lactone which is believed to have the formula

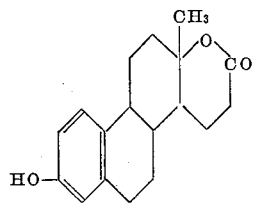

This hydroxy lactone may be purified by crystallization from cyclohexanone or methyl Cellosolve, and when pure, melts at 339° C. Elementary analysis shows that it has the composition $C_{18}H_{22}O_3$, so that it is isomeric with the compound obtained by Westerfeld. It contains an hydroxyl group, as shown below by its ability to form esters and ethers. This hydroxyl group is phenolic in nature (as in estrone) since, after the lactone ring is opened by treatment with sodium hydroxide, the compound forms a disodium salt (one sodium on the carboxyl group created by opening the lactone ring and one on the phenolic hydroxyl group). The hydroxyl group formed in opening the lactone ring is alcoholic in nature, and probably tertiary. The similarity of chemical properties with Westerfeld's lactone suggests the possibility that the difference between the two compounds may lie in the arrangement of groups about one or more of the asymmetric carbon atoms of the molecule, though this has not been established as fact, and the value and efficacy of this invention are in no way dependent upon the ultimate accuracy of such a speculation.

As stated above, the lactone of the dihydroxy acid of our invention exhibits a free phenolic hydroxyl group which can be readily esterified with a variety of organic acids by the application of conventional techniques of organic chemistry. For instance, warming of the pure hydroxy lactone in pyridine solution with acetic anhydride yields the acetoxy compound ($C_{20}H_{24}O_4$) described above. Similarly, use of propionic anhydride leads to the propionate ($C_{21}H_{26}O_4$, melting point 146°–148.5° C.) and benzoyl chloride leads to the benzoate ($C_{25}H_{26}O_4$, melting point 241°–243° C.). As is readily apparent, other organic acids, both monobasic and polybasic, may be used to form the corresponding esters.

The phenolic hydroxyl group of this lactone of the dihydroxy acid of our invention can also be etherified by treatment of a warm aqueous alkaline solution of the hydroxy lactone with an alkylating agent, such as dimethyl sulfate. During such treatment, the lactone ring is opened (the compound in such aqueous alkaline solution is in fact the disodium salt of the corresponding dihydroxy acid), and upon acidification of the reaction mixture the monomethyl ether ($C_{19}H_{26}O_4$, melting point 135°–136° C. with decomposition) of this dihydroxy acid is obtained. Heating of the acidified reaction mixture causes reformation of the lactone ring and the methoxy lactone ($C_{19}H_{24}O_3$, melting point 172.5°–174° C.) is obtained. The use of other alkylating agents with the hydroxy lactone, such as methyl iodide and silver oxide, lead to the formation of the methyl ether directly. Other alkyl sulfates, halides, and the like may of course be used to produce different alkoxy derivatives. Westerfeld reported a melting point of 166°–168° C. for the methyl ether of his compound.

The monosodium salt of the dihydroxy acid of our invention may be obtained by saturating a cool alkaline solution of the acid (most readily prepared by hydrolyzing the hydroxy lactone in an excess of alkali) with carbon dioxide. After concentration of the solution, the desired monosodium salt crystallizes, and can be purified by crystallization from ethanol. It occurs as thin needles which melt at 285° C. with decomposition. This salt (and others which may be similarly prepared) is water soluble and thus constitutes a desirable means of preparing the compounds of this invention for therapeutic administration in water solution. As stated above, the free dihydroxy acid ($C_{18}H_{24}O_4$) is obtained by careful acidification of the sodium salt without relactonization.

Treatment of the dihydroxy acid with diazomethane yields a dihydroxy methyl ester ($C_{19}H_{26}O_4.\frac{1}{2}H_2O$, melting point 95–97° C.). Similarly, treatment of the monomethyl ether of the dihydroxy acid (described above) with diazomethane yields the methyl ester ($C_{20}H_{28}O_4$, melting point 75–78° C.) of the monomethyl ether of the dihydroxy acid.

While there have been described above the preparation and certain properties of a number of derivatives of the new dihydroxy acid of this invention, we have found that among these compounds the dihydroxy acid itself and certain of its salts, esters, and ethers are preferred forms of this invention, primarily because of their relative superiority for therapeutic use and physiological activity. For this reason most of the work in demonstrating the novel physiological properties of the compounds of this invention has been done with the dihydroxy acid and its derivatives.

The differences between both the lactonized and unlactonized derivatives of the dihydroxy acid as prepared and described in this invention and the lactone of Westerfeld may best be recognized by the following differences in their physiological properties:

(1) While the estrogenic activity of the saponified lactone of Westerfeld is less than that of estrone it is nonetheless a fairly potent estrogen. In contrast, the dihydroxy acid of our invention exhibits not more than $1/100$ of the estrogenic activity of estrone and many of the derivatives of this acid exhibit considerably less estrogenic activity than the parent acid.

(2) The saponified lactone of Westerfeld stimulates the secretion of gonadotrophin (especially luteinizing hormone) from the pituitary gland; the dihydroxy acid of our invention and its derivatives not only fail to stimulate such secretion, but inhibit it.

(3) The saponified lactone of Westerfeld stimulates the secretion of corticotrophin by the pituitary gland; the dihydroxy acid of our invention and its derivatives do not so stimulate the pituitary gland.

(4) The saponified lactone of Westerfeld greatly increases the response of immature female rats to injections of follicle stimulating hormone; the dihydroxy acid of our invention and its derivatives produce no such augmented response.

It is thus quite apparent that, while such conventional properties as melting points and solubilities are somewhat similar for the three lactone derivatives produced by Westerfeld and the corresponding lactonized derivatives of the dihydroxy acid of this invention nonetheless the compounds cannot be identical, for if they were, they could not have such widely differing physiological properties.

The invention is defined by the appended claims.

We claim:

1. A member of the class consisting of the 2-methyl-2,7-dihydroxy-1,2,3,4,4$a$,9,10,10$a$-octahydrophenanthrene-1-propionic acid produced by the oxidation of a lower alkanoic acid ester of estrone with hydrogen peroxide in an acid medium followed by hydrolysis with alkali and acidification, said acid melting at about 225° C. with effervescence, and alkali metal salts, lower alkyl esters, and lower alkyl ethers of said acid, said compound being further characterized by exhibiting no more than approximately $1/100$ of the estrogenic activity of estrone and by inhibiting the secretion of gonadotrophin by the pituitary gland.

2. 2-methyl-2,7-dihydroxy - 1,2,3,4,4$a$,9,10,10$a$-octahydrophenanthrene-1-propionic acid, produced by the oxidation of estrone with hydrogen peroxide in an acid medium followed by hydrolysis with alkali and acidification, said acid melting at about 225° C. with effervescence and being further characterized by exhibiting no more than approximately $1/100$ of the estrogenic activity of estrone and by inhibiting the secretion of gonadotrophin by the pituitary gland.

3. An alkali metal salt of a lower alkyl ether of the acid defined by claim 2.

4. The sodium salt of a lower alkyl ether of the acid defined by claim 2.

5. The sodium salt of the 7-methyl ether of the acid defined by claim 2.

6. A lower alkyl ester of the acid defined by claim 2.

7. The methyl ester of the acid defined by claim 2.

8. An alkali metal salt of the acid defined by claim 2.

9. The sodium salt of the acid defined by claim 2.

10. A lower alkyl ester of a lower alkyl ether of the acid defined by claim 2.

11. The methyl ester of the 7-methyl ether of the acid defined by claim 2.

ROBERT P. JACOBSEN.
GREGORY PINCUS.

References Cited in the file of this patent

UNITED STATES PATENTS

| Number | Name | Date |
| --- | --- | --- |
| 2,480,246 | Jacobsen et al. | Aug. 30, 1949 |

OTHER REFERENCES

Westerfeld, J. Biol. Chem., vol. 143, pp. 177–184 (1942).